United States Patent Office 3,510,458
Patented May 5, 1970

---

3,510,458
POLYCARBONATES OF PERFLUOROALKYL-TERMINATED ALKYL-1,3-PROPANEDIOLS
Gordon L. Thayer, Jr., Wilmington, Del., assignor to E. I. du Pont de Nemours and Company, Wilmington, Del., a corporation of Delaware
No Drawing. Filed July 26, 1967, Ser. No. 656,018
Int. Cl. C08g 17/13; C07c 33/10
U.S. Cl. 260—77.5                                4 Claims

ABSTRACT OF THE DISCLOSURE

Polycarbonates prepared by the condensation of perfluoroalkyl-terminated alkyl-1,3-propanediols of the formula $(R_f-R')_a CH_{2-a}(CH_2OH)_2$ and dialkyl carbonates. The propanediols are prepared from a substituted malonic acid of the formula $(R_f-R')_a CH_{2-a}(COOR)_2$, which is turn is prepared from the basic malonic acid ester and $R_f-R'-Z$.

The polymers are useful as elastomers.

---

BACKGROUND OF THE INVENTION

Field of the invention

This invention relates to certain polymers derived from perfluoroalkyl-terminated alkyl-1,3-propanediols.

Description of the prior art

Interest in the heat-resistant properties and the solvating powers of fluorinated organic compounds has led to increased activity in the preparation of various fluorine-containing organic materials. The preparation of such materials is, however, frequently difficult and expensive, and little has been done in the field of obtaining condensation polymers having pendant perfluoroalkyl groups.

SUMMARY OF THE INVENTION

This invention is directed to polycarbonates comprising the condensation product of (1) at least one perfluoroalkyl-terminated alkyl-1,3-propanediol represented by the structural formula (1)  $(R_f-R')_a CH_{2-a}(CH_2OH)_2$ wherein $R_f$ is perfluoroalkyl of 4–20 carbons, R' is alkylene of 2–12 carbons, R is hydrogen or lower alkyl, and $a$ is the whole number 1 or 2; and (2) at least one dialkyl carbonate.

DESCRIPTION OF THE INVENTION

The polycarbonates of this invention are derived from at least one diol of Formula 1 and at least one dialkyl carbonate.

As is seen from Formula 1, the diols are monosubstituted ($a=1$) or disubstituted ($a=2$) with perfluoroalkyl-alkyl groups. The perfluoroalkyl group $R_f$ can be either straight chain or branched chain, and is defined herein as including cyclic perfluoroalkyl although these latter groups are less desirable because of their general unavailability. Preferably, $R_f$ contains 6–12 carbon atoms and is straight chained. Representative perfluoroalkyl groups include the perfluorinated groups derived from butyl, amyl, hexyl, heptyl, octyl, decyl, dodecyl, tetradecyl, hexadecyl, octadecyl, eicosyl, isoamyl, isoheptyl, cyclobutyl, cyclohexyl, methylcyclohexyl and the like. Of these, the groups hexyl to dodecyl are preferred.

The group R', is Formula 1, is preferably the divalent straight-chain group $-(CH_2)_m-$ where $m$ is 2–12, although it can be branched. Most preferably, $m$ is a cardinal number of 2–4. Representative R' groups include ethylene, butylene, decylene and dodecylene.

The dialkyl carbonates are preferably di(lower) alkyl carbonates such as dimethyl, diethyl, dibutyl or dihexyl carbonates.

The polycarbonates of the invention are prepared by techniques will known for the manufacture of polyesters. Ordinarily, mixtures of the diols and the carbonates are heated together in the presence of an acidic transesterification catalyst such as antimony trioxide, tetraisopropyl titanate, toluenesulfonic acid, and the like. The heating is carried out at temperatures sufficient to cause the volatile alcohol derived from the carbonate to distill. In most instances, temperatures in the range of 80° C. (when using dimethyl carbonate) or about 120° C. (when using diethyl carbonate or other carbonates) are employed initially. As the polymerization proceeds and free dialkyl carbonate ceases to exist, the reaction temperature may be raised to about 150° C. to 320° C. Usually, a reduced pressure is applied to the reaction vessel in the latter stages of the reaction, along with higher temperatures, to keep the mass fluid and to remove last traces of volatile alcohol. When no further polymerization occurs, generally as judged by no further increase in viscosity of the reaction mass, the polymer is collected and cooled.

The recurring units of the polymer formed have the structural formula (2)

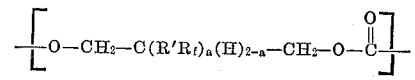

It is understood that the polymer may contain other units derived from diols such as aliphatic glycols. Preferably, such diols have the formula $H\text{-}[O(CH_2)_4]_n\text{-}OH$ where $n$ is 2–7 or more carbon atoms.

The diols of Formula 1 are prepared from a malonic ester of the formula (3)                     $CH_2(COOR)_2$ where R is lower alkyl; and (4)                     $R_f-R'-Z$ where $R_f$ and R' are defined as above and Z is a displaceable group such as halogen or the toluene sulfonate ester.

The reactants of Formulas 3 and 4 are treated with a base as described generally by Cope, Holmes and House in chapter 4, volume 9, of "Organic Reactions," Wiley, 1957; and in U.S. Ser. No. 656.076, filed July 26, 1967 in the name of Kenneth C. Smeltz. The product of the reaction between the compounds of Formulas 3 and 4 is a compound of the formula (5)                 $(R_f-R')_a CH_{2-a}(COOR)_2$ wherein $R_f$, R', $a$ and R are as previously defined.

Compound (5) is then reduced to obtain the diol reactant of Formula 1 which is employed in preparing the polycarbonate polymers of this invention. Reduction is accomplishd by well-known methods such as those described in "Organic Reactions," vol. 6, chapter 10, Wiley, 1951; Wagner and Zook, "Synthetic Organic Chemistry," section 84, pp. 155–157, Wiley, 1953; Gilman, "Organic Chemistry," 2nd ed., vol. 1, pp. 827–831, Wiley, 1949; and in U.S. Ser. No. 656,076, filed July 26, 1967 in the name of Kenneth C. Smeltz.

The following examples serve only to illustrate the polymers and the preparation of the polymers of this invention in greater detail, and are not to be considered limiting in any respect.

Example 1.—$(R_f-R')_a CH_{2-a}-COOR$

Sodium metal (9.7 g.) was added to 311 g. of dry tert-butanol in an anhydrous system. After heating under reflux for 24 hours, reaction was not complete. 48 ml. dry methanol were added, causing the remaining sodium to react within one hour. Approximately 75 ml. of liquids were distilled from the mixture. The mixture was cooled to 50° C. and 69 g. of freshly distilled diethyl malonate were added dropwise over a six minute period. Then 250 ml. of liquid were distilled from the mixture under a nitrogen atmosphere, the mixture was cooled to 65° C. and 199 g. of $F(CF_2)_6CH_2CH_2I$ were added dropwise under a nitrogen atmosphere in ten minutes. The resulting mixture was heated under reflux for 2.5 hours during which time considerable white solids precipitated. Then about 250 ml. of liquid were distilled from the mixture at which point the pot temperature reached 120° C. The residue was cooled, ether was added and the solution was extracted with a few ml. of 5% hydrochloric acid. The aqueous layer was made more strongly acidic and extracted with ether. The combined ether solutions were washed with water and dried over anh. sodium sulfate. Distillation under reduced pressure gave 15.3 g. of impure starting material $F(CF_2)_6CH_2CH_2I$, B.P. 74.5–90° C./23 mm., and 108.4 g. of mixed methyl and ethyl esters of $F(CF_2)_6CH_2CH_2CH(CO_2H)_2$ (3,3,4,4,5,5,6,6,7,7,8,8,8-tridecafluorooctylmalonic acid) $n_D^{20}$ 1.3619–1.3481, 52.5% yield.

Example 2.—$(R_fR')_aCH_{2-a}(CH_2OH)_2$

A solution of 51 g. of $F(CF_2)_6CH_2CH_2CH(CO_2C_2H_5)_2$ in 200 ml. dry purified diethyl ether was added dropwise to a stirred slurry of 7.6 g. lithium aluminum hydride in 500 ml. dry purified ether under nitrogen. The addition took one hour, while maintaining the mass under gentle reflux. After addition was complete, the mass was heated under reflux for two hours. Ethyl acetate (30 ml.) was added dropwise to the cooled mixture followed by 400 g. of 10% aqueous sulfuric acid. After stirring for a short time, the resulting mixture was separated and the aqueous layer extracted with ether. The combined ether layers were dried over anh. sodium sulfate. Evaporation of the ether gave 33.1 g. of crude white crystals, M.P. 55–65° C. and 6.1 g. of liquid. Distillation of the liquid under reduced pressure indicated it to be a mixture of starting ester and a substance which appeared to be

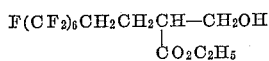

due to incomplete reduction.

The solids were recrystallized from an 80/20 (by volume) mixture of benzene/acetonitrile, giving 29.4 g. of $F(CF_2)_6CH_2CH_2CH(CH_2OH)_2$ [2 - (3',3',4',4',5',5',6',6',7',7',8',8',8'-tridecafluorooctyl) - 1,3 - propanediol], M.P. 72.5–73.5° C. The product may also be recrystallized from chloroform.

*Analysis.*—Calcd. for $C_{11}H_{11}F_{13}O_2$ (percent): C, 31.29; H, 2.61; F, 58.52; O, 7.58. Found (percent): C, 31.2; H, 2.6; F, 58.5.

The nuclear magnetic resonance spectra in the H1 and F19 regions agreed with the assigned structure.

Example 3.—Polycarbonate polymer

An agitated vessel fitted with a distillation head and containing 17.0 parts $n-C_6F_{13}CH_2CH_2(CH_2OH)_2$, 9.4 parts diethyl carbonate, 0.01 part antimony trioxide and 0.05 g. calcium acetate monohydrate was purged with nitrogen, then heated at 120–128° C. for 2.25 hours. No ethanol distilled. One part tetraisopropyl titante was added and the mixture was heated at 155–170° C. for 9.5 hours. Ethanol distilled very slowly. The temperature was increased in 0.5 hour to 220° C. with virtually no further distillation. The pressure was reduced to 2.5 mm. while heating at 220–250° C. and the mixture became quite viscous.

The resulting polymer, on cooling, was not appreciably soluble in chloroform or hot o-dichlorobenzene but was readily soluble in trichlorotrifluoroethane. The polymer was precipitated by pouring the solution into methanol. The dried polymer, having the structure

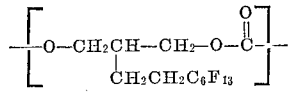

was soft and slightly elastomeric.

*Analysis.*—Calcd. for $C_{12}H_9O_3F_{13}$ (percent): C, 32.0; H, 2.0; F, 55.1. Found (percent): C, 31.1; H, 2.1; F, 55.0.

By replacing the diol used in Example 3 with any other diol described herein falling within the definition of the compounds of Formula 1, and by replacing the dialkyl carbonate with any other dialkyl carbonate described herein, other polycarbonates of the invention are obtained.

The polymers of the invention are elastomeric and find utility in elastomer applications, in much the same applications as known polyurethanes. For example, the polymers can be employed in elastomeric molded items such as gaskets, O-rings, shoe soles, fabric laminates and the like.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A polycarbonate consisting essentially of recurring units of the structural formula

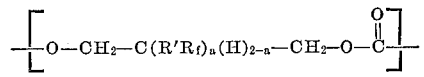

wherein $R_f$ is perfluoroalkyl of 4–20 carbon atoms, R' is alkylene of 2–12 carbon atoms, and $a$ is the whole number 1 or 2.

2. The polycarbonate of claim 1 wherein $R_f$ is of 6–12 carbon atoms and R' is of 2–4 carbon atoms.

3. The polycarbonate of claim 1 wherein $R_f$ is of 6 carbon atoms, R' is of 2 carbon atoms and $a$ is 1.

4. The polycarbonate of claim 1 which additionally contains minor proportions of recurring units of the structural formula

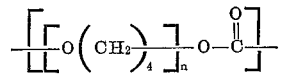

wherein $n$ is a whole number between 2 and 7.

References Cited

UNITED STATES PATENTS

| | | | |
|---|---|---|---|
| 3,220,978 | 11/1965 | Jaquiss | 260—77.5 |
| 3,301,824 | 1/1967 | Hostettler et al. | 260—77.5 |
| 3,326,855 | 6/1967 | Matzner et al. | 260—77.5 |

OTHER REFERENCES

Sarel et al.: "Jour. American Chemical Society," vol. 80, September 1958, pp. 4596–9.

SAMUEL H. BLECH, Primary Examiner

U.S. Cl. X.R.

260—633, 485, 653